United States Patent
Arya et al.

(10) Patent No.: US 9,647,458 B2
(45) Date of Patent: May 9, 2017

(54) DISTRIBUTED PHASE BALANCING

(71) Applicants: International Business Machines Corporation, Armonk, NY (US); Universiti Brunei Darussalam, Gadong (BN)

(72) Inventors: Vijay Arya, Bangalore (IN); Tanuja H. Ganu, Bangalore (IN); Jagabondhu Hazra, Bangalore (IN); Saiful Azmi bin Hj Husain, Gadong (BN); Shivkumar Kalyanaraman, Bangalore (IN); Devasenapathi P. Seetharamakrish, Bangalore (IN)

(73) Assignees: International Business Machines Corporation, Armonk, NY (US); Universiti Brunei Darussalam, Muara (BN)

( * ) Notice: Subject to any disclaimer, the term of this patent is extended or adjusted under 35 U.S.C. 154(b) by 434 days.

(21) Appl. No.: 14/287,456

(22) Filed: May 27, 2014

(65) Prior Publication Data
US 2015/0349529 A1 Dec. 3, 2015

(51) Int. Cl.
*H02J 3/26* (2006.01)
*G05B 15/02* (2006.01)
*H02J 3/14* (2006.01)

(52) U.S. Cl.
CPC ............. *H02J 3/26* (2013.01); *G05B 15/02* (2013.01); *H02J 3/14* (2013.01); *Y02E 40/50* (2013.01)

(58) Field of Classification Search
CPC ........ H02J 3/14; H02J 3/26; H02J 3/28; H02J 3/48; H02J 3/50; H02J 4/00; Y04S 10/54;
(Continued)

(56) References Cited

U.S. PATENT DOCUMENTS 8,521,337 B1 * 8/2013 Johnson .................. H02J 3/008
370/252
9,281,689 B2 * 3/2016 Boardman ............... H02J 3/26
(Continued)

FOREIGN PATENT DOCUMENTS

EP 2019467 A1 1/2009

OTHER PUBLICATIONS

Sathiskumar et al. A Self Adaptive Hybrid Differential Evolution Algorithm for Phase Balancing of Unbalanced Distribution System, International Journal of Electrical Power & Energy Systems, vol. 42, Issue 1, Nov. 2012, pp. 91-97.
(Continued)

*Primary Examiner* — Crystal J Barnes-Bullock
(74) *Attorney, Agent, or Firm* — Ryan, Mason & Lewis, LLP

(57) ABSTRACT

Methods, systems, and computer program products for distributed phase balancing are provided herein. A method of use in connection with a distribution network having a phase imbalance includes determining one or more power consumption parameters associated with a given entity of the distribution network; determining one or more power supply parameters associated with the given entity of the distribution network; and computing, based on said one or more power consumption parameters and said one or more power supply parameters, at least one of (i) a level of power consumption increase and/or decrease and (ii) a level of power supply increase and/or decrease associated with one or more devices of the given entity to remedy the phase imbalance within the distribution network.

17 Claims, 4 Drawing Sheets

(58) Field of Classification Search
CPC ........ Y04S 20/222; Y04S 20/224; G06F 1/26;
G06Q 50/06; G05F 1/66; Y02E 40/50;
Y02B 70/3225
See application file for complete search history.

(56) References Cited

U.S. PATENT DOCUMENTS

| | | | | |
|---|---|---|---|---|
| 2010/0306097 | A1* | 12/2010 | Greiner | G06Q 40/04 705/37 |
| 2012/0074779 | A1 | 3/2012 | Black et al. | |
| 2012/0104850 | A1 | 5/2012 | Fallis et al. | |
| 2012/0175951 | A1 | 7/2012 | Pamulaparthy et al. | |
| 2012/0194144 | A1 | 8/2012 | Koren et al. | |
| 2012/0316691 | A1 | 12/2012 | Boardman et al. | |
| 2013/0204451 | A1* | 8/2013 | Staehle | G01W 1/10 700/291 |
| 2013/0338843 | A1* | 12/2013 | Iravani | H02J 4/00 700/295 |
| 2016/0178678 | A1* | 6/2016 | Pelletier | B60L 11/1842 705/39 |

OTHER PUBLICATIONS

Gupta et al. A Novel Strategy for Phase Balancing in Three-Phase Four-Wire Distribution Systems, Power and Energy Society General Meeting, 2011 IEEE.
Dilek et al. Simultaneous Phase Balancing at Substations and Switches with Time-Varying Load Patterns, Power Systems, IEEE Transactions on, (vol. 16, Issue: 4), Nov. 2001.
Zhu et al. Phase Balancing using Mixed Integer Programming, Power Systems, IEEE Transactions on, (vol. 13, Issue: 4), Nov. 1998.

* cited by examiner

DISTRIBUTED PHASE BALANCING

FIELD OF THE INVENTION

Embodiments of the invention generally relate to information technology, and, more particularly, to phase balancing techniques.

BACKGROUND

Commonly, three-phase power is fed into a distribution network, carried from a substation to customers via feeders. Each customer is generally a one-phase entity and is powered by one of the three phases of the feeder. Depending on the distribution of customers on each phase and the variation of load over time, the total load on the three phases can be unbalanced in a distribution system. Unbalanced phases can lead to higher energy losses and a decrease in the lifetime of grid assets such as substation transformers. Unbalanced phases also affect equipment utilization and limit the maximum load that can be supplied to customers. Moreover, phase imbalances are expected to increase in the future with the introduction of heavier loads such as electric vehicles.

Existing phase balancing approaches require power measurements from customers and from possible balance point locations in the grid or distribution network. This requires a communication infrastructure to carry measurements from customer sensors to the utility, which is generally expensive to deploy and may not always be available or reliable. Additionally, existing phase balancing approaches require a demand response signal to be sent to the customers to change consumption and/or supply to balance the loads. This similarly requires a communication infrastructure between the utility and customers. Further, existing phase balancing approaches can include rewiring customers to different phases to balance the loads. This is an expensive manual operation and includes the risk that one fixed configuration of phase assignments may not work under all conditions.

Consequently, a need exists for distributed techniques that balance the load on the three phases dynamically and autonomously.

SUMMARY

In one aspect of the present invention, techniques for distributed phase balancing are provided. An exemplary computer-implemented method of use in connection with a distribution network having a phase imbalance can include steps of determining one or more power consumption parameters associated with a given entity of the distribution network; determining one or more power supply parameters associated with the given entity of the distribution network; and computing, based on said one or more power consumption parameters and said one or more power supply parameters, at least one of (i) a level of power consumption increase and/or decrease and (ii) a level of power supply increase and/or decrease associated with one or more devices of the given entity to remedy the phase imbalance within the distribution network.

In another aspect of the invention, an exemplary computer-implemented method of use in connection with a three-phase electrical power system with a phase imbalance can include determining, locally at a single-phase entity within the three-phase electrical power system, one or more power consumption parameters associated with the single-phase entity, as well as determining, locally at the single-phase entity, one or more power supply parameters associated with the single-phase entity. The method can also include computing, based on said one or more power consumption parameters and said one or more power supply parameters, at least one of (i) a level of power consumption increase and/or decrease and (ii) a level of power supply increase and/or decrease associated with one or more devices of the single-phase entity to remedy the phase imbalance within the three-phase electrical power system. Further, the method includes outputting, based on said computing, a schedule of power consumption and/or power supply for the one or more devices of the single-phase entity for one or more future time steps.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes a distributed approach to phase balancing which avoids the need for a communication infrastructure between the utility and the consumers. At least one embodiment of the invention includes providing a system wherein an individual customer-level or plug-level device senses phase imbalance locally by measuring one or more power parameters and works independently to balance the total load on the phases by either increasing or decreasing its consumption and/or supply from behind-the-meter resources. As referred to herein, behind-the-meter resources can include appliances that can reduce or shift consumption, storage sources (such as an inverter, electric vehicle, etc.), distributed generation sources (such as wind or solar power), or a local generator.

Measuring imbalance at a single-phase load can include enabling a given single-phase customer to locally sense imbalance across the three phases by measuring the neutralto-ground (N-G) voltage or current at its (that is, the given single-phase customer's) phase. Current on the neutral wire is the vector sum of currents on the three phases. When the phases are balanced, the neutral current is zero. When the phases are imbalanced, the neutral current is non-zero. It is to be noted that a higher N-G current (or equivalent voltage) corresponds to a larger imbalance.

Figure 1:
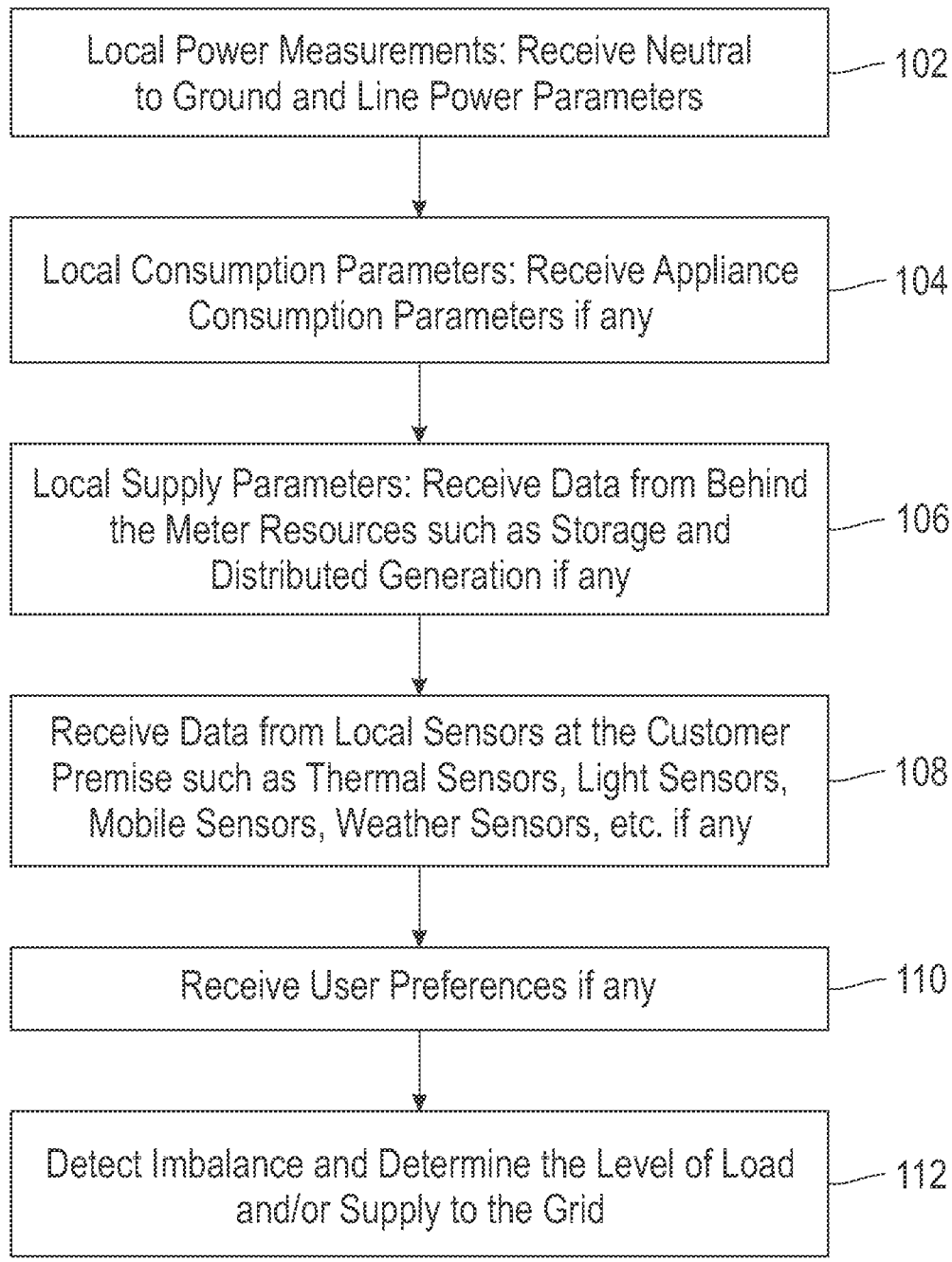
FIG. 1 is a flow diagram illustrating the imbalance detecting and correction techniques according to an embodiment of the present invention.

FIG. 1 is a flow diagram illustrating the imbalance detecting and correction techniques according to an embodiment of the present invention. For example, the techniques depicted in FIG. 1 can be implemented and/or carried out by a given single-phase customer. Step 102 includes receiving various local power measurements at the customer premises. Such measurements can include neutral current (ampere), neutral-to-ground voltage (volts) and neutral-to-ground power (watt-hour (Wh)), line voltage, line current, and line power. Such parameters may be measured at different points in the electric circuit of a customer environment. For instance, the parameters may be measured at the socket where an appliance (demand) connects to receive power or where a solar panel or a distributed generation source (supply) connects to supply power. Similarly, such parameters may be measured at an aggregate level where power enters or leaves the customer environment. Additionally, for example, a smart plug, smart meter, or an appliance/distributed generation source itself may also help measure such parameters.

Step 104 includes receiving demand and/or consumption data from appliances. For example, such data can include a time series of watt-hours consumed by different appliances, and such data can be obtained from smart plugs or other sensors which meter the power supplied to appliances. Step 106 includes receiving supply data from behind-the-meter generation resources such as storage (for instance, a battery), solar power, wind generation, or other renewable generation sources. Such supply data can include, for example, a time series of watt-hours supplied by each renewable generation source, and/or the state of the generation resource (charge in the battery, etc.). Also, such parameters can be measured via smart plugs or other sensors, which monitor generation resources.

Step 108 includes receiving data from local sensors such as thermal sensors, light sensors, and/or mobile sensors at the premises of a given single-phase customer, if any. Step 110 includes receiving user preferences such as preferences related to time periods when the customer may want to use the shiftable and/or reducible loads (for example, in connection with a washing machine, a dishwasher, electric vehicles, cycling of air conditioners, pool pumps, etc.). Further, step 112 includes detecting imbalance based on the local power measurements and the corresponding level of load and/or supply to the grid from the given single-phase customer to help mitigate imbalances.

Accordingly, phase imbalances are detected by monitoring neutral-to-ground power parameters. At least one embodiment of the invention includes examining historical neutral-to-ground current data, determining the minimum and maximum values and determining imbalance as a fraction as follows: Imbalance=$(I\_curr-I\_min)/(I\_max-I\_min)$, wherein $I\_curr$ is the neutral current and $I\_min$ and $I\_max$ are the minimum and maximum values, respectively, determined from the data. Alternatively, $I\_min$ and $I\_max$ can be set based on typical values seen in the power system.

As such, based on a measured phase imbalance and any local constraints from the given single-phase customer, at least one embodiment includes determining the increase and/or decrease of customer load or supply to reduce imbalance on the phases.

Figure 2:
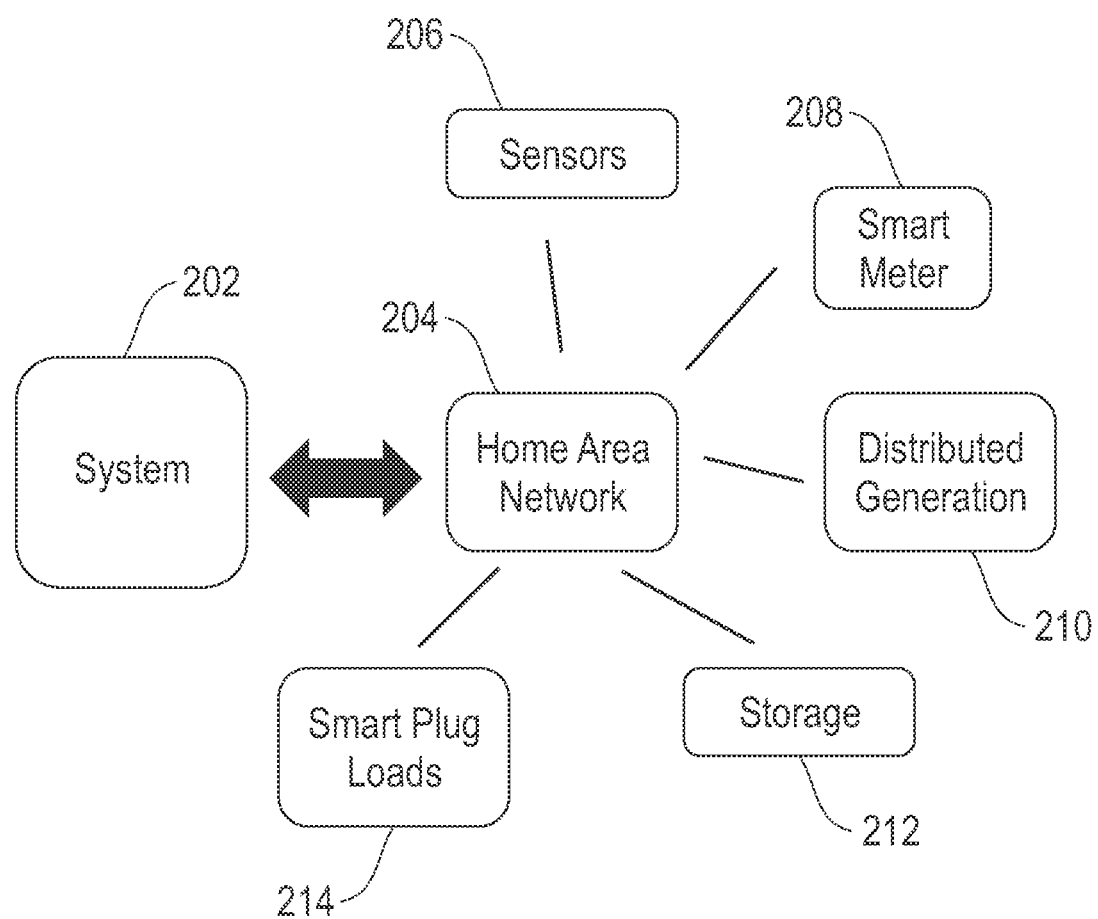
FIG. 2 is a diagram illustrating example architecture, according to an aspect of the invention.

FIG. 2 is a diagram illustrating example architecture, according to an aspect of the invention. By way of illustration, FIG. 2 depicts a system 202 at a customer premise interacting with one or more demand and/or consumption sources over a home area network 204. The single customer network 204 is additionally connected to one or more sensors 206, a smart meter 208, a distributed generation component 210, a storage component 212 and one or more smart plug loads 214 (which can include, for example, appliance loads, electric vehicle loads, etc.).

In connection with the example architecture depicted in FIG. 1, the system 202 may receive power measurements from power meters and smart plugs and sensor measurements from any sensors deployed at the home over the home area network 204, and may also send signals to smart plugs, meters and/or sensors which control appliances to increase and/or decrease demand or supply via the home area network 204, whereby the system 202 and the home area network 204 are connected wirelessly or via a hard-wired connection such as a power line.

By sensing the N-G power parameters such as voltage and current, an individual single-phase customer or device can sense imbalance, but it may not be immediately clear if the customer has to increase and/or decrease load (or equivalently increase and/or decrease supply) to reduce the imbalance between the three phases. Accordingly, at least one embodiment of the invention includes facilitating such a determination.

At least one embodiment of the invention includes periodically introducing a random pattern of high and low demands over k time intervals and monitoring whether imbalance increases or decreases with an increase in demand. Based on such monitoring, a determination can be made as to the total demand to be met from the grid and, if necessary, based on the energy available in the storage, such an embodiment can further include meeting the balance requirements from local storage of the single-phase customer.

In another embodiment of the invention, the system 202 introduces a random pattern of high and low supply over k time intervals (sense) and monitors whether the imbalance increases or decreases with increase in supply. Based on such monitoring, the system 202 determines the level of supply and the amount of energy to store in local storage 212 of the single-phase customer to supply at a later time.

Additionally, the system 202 can monitor phase imbalance at each time step and additively or multiplicatively increase the demand levels (level 1, level 2, . . . , etc.) until the imbalance level crosses an upper threshold, at which point the system 202 decreases the demand additively or multiplicatively until the imbalance reaches a lower threshold. In at least one embodiment of the invention, the lower and upper thresholds can be dependent on the minimum and maximum neutral current values $I\_min$ and $I\_max$. The above steps can be repeated continuously to consume power, for example, while charging an electric vehicle. In this manner, the above algorithm helps mitigate imbalances while consuming power. A similar approach may be implemented, for example, for supplying power into the grid using distributed generation.

In an alternative embodiment of the invention, the system 202 monitors imbalance and the load and/or supply over time and uses historical data to identify high and low imbalance periods as well as correlate the consumption and/or supply time series with the imbalance time series during high imbalance periods. Based on such data, the system 202 can additionally determine the appropriate action to increase and/or decrease load during each of the imbalance periods. A similar approach may also be implemented for supplying power into the grid using distributed generation.

Further, in at least one embodiment of the invention, the system monitors N-G power parameters along with the line voltage. If the line voltage is low and the N-G parameters indicate imbalance, the system determines an appropriate level of action by decreasing load and/or increasing supply. On the other hand, if the line voltage is high and the N-G parameters indicate imbalance, the system 202 determines an appropriate level of action by increasing load and/or decreasing supply. For example, in at least one embodiment of the invention, imbalance=(I_curr−I_min)/(I_max−I_min), wherein I_curr is the neutral current and I_min and I_max are the minimum and maximum values, respectively, determined from data or based on typical values seen in the power system. In such an embodiment, V_drop=(V_curr−V_avg)/V_avg, wherein V_curr is the line voltage and V_avg is determined from data or typical values seen in the system. If V_drop is >0 and imbalance> a given threshold, then the load is increased by a fraction, and if V_drop is <0 and imbalance> a given threshold, then the supply is increased by a fraction or the load is decreased by a fraction.

One or more embodiments of the invention can additionally be implemented in connection with a two- or three-phase load or customer. Two- or three-phase loads may, for example, be supplied to larger residential customers, supermarkets, commercial buildings, and data centers, and two- or three-phase supply may be derived, for example, from larger distributed generation points. Imbalances across the two- or three-phase components can be measured locally at the entry of such a customer in accordance with the single-phase customer techniques detailed herein. Additionally, in at least one embodiment of the invention, a two- or three-phase customer can further ensure that its aggregate load and/or supply across the phases remains balanced in accordance with one or more of the following techniques.

For example, the system can measure imbalance at the entry node and, using the connected model of the building (which identifies which socket is on which phase) and constraints of various appliances, determine the appropriate level of supply and/or consumption of various appliances, distributed generation, and/or storage to ensure that the balance is maintained at the entry node. As used above, the entry node can include the point where the power supply enters the building (for example, where the meter is deployed). In another technique, the system can leverage historical data to determine the appropriate level of supply and/or consumption of various appliances, storage, distributed generation, and storage over time, to ensure that the balance is maintained at the entry node. The historical data may be obtained via smart plugs, meters, and/or other sensors deployed in the building.

Figure 3:
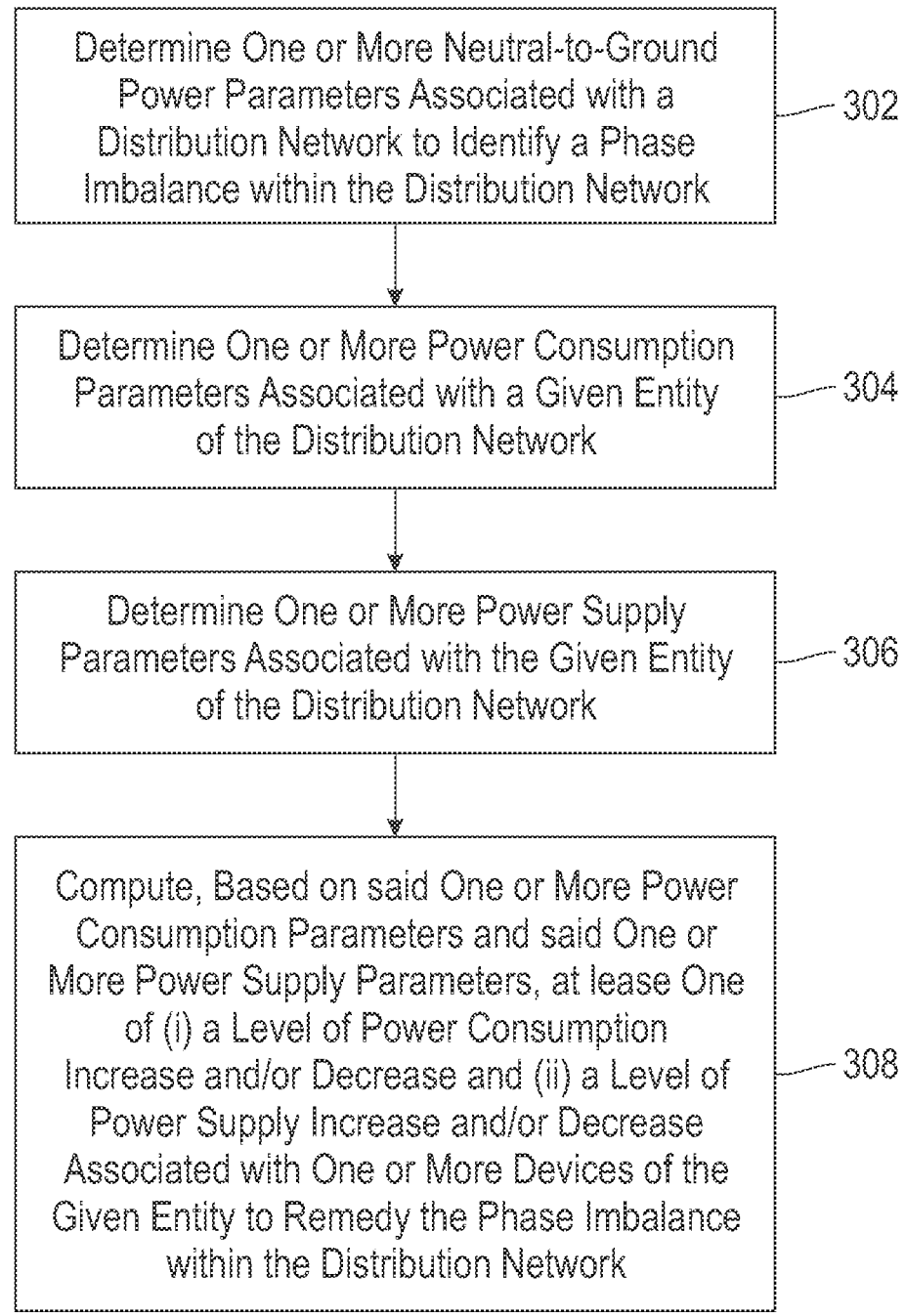
FIG. 3 is a flow diagram illustrating techniques according to an embodiment of the invention.

FIG. 3 is a flow diagram illustrating techniques according to an embodiment of the present invention. Step 302 includes determining one or more neutral-to-ground power parameters (for example, voltage or current) associated with a distribution network to identify a phase imbalance within the distribution network.

Step 304 includes determining one or more power consumption parameters (for example, voltage or current) associated with a given entity of the distribution network. As detailed herein, the given entity of the distribution network can include a single-phase entity, a two-phase entity, or a three-phase entity. Additionally, the power consumption parameters can include a parameter related to aggregate per-phase consumption and/or a parameter corresponding to each individual device associated with the given entity.

Step 306 includes determining one or more power supply parameters (for example, voltage or current) associated with the given entity of the distribution network. The power supply parameters can include a parameter related to aggregate per-phase supply, a parameter corresponding to a storage component associated with the given entity and/or a parameter corresponding to distributed generation associated with the given entity.

Step 308 includes computing, based on said one or more power consumption parameters and said one or more power supply parameters, at least one of (i) a level of power consumption increase and/or decrease and (ii) a level of power supply increase and/or decrease associated with one or more devices of the given entity to remedy the phase imbalance within the distribution network.

The techniques depicted in FIG. 3 can additionally include outputting, based on said computing, a schedule of consumption and/or supply from the one or more devices of the given entity for one or more future time steps at one or more phases. Also, as described herein, at least one embodiment of the invention can include obtaining one or more items of sensor data derived from a sensor associated with the given entity.

Further, at least one embodiment of the invention can include techniques for use in connection with a three-phase electrical power system with a phase imbalance. Such an embodiment additionally includes determining, locally at a single-phase entity within the three-phase electrical power system, one or more power consumption parameters associated with the single-phase entity, as well as determining, locally at the single-phase entity, one or more power supply parameters associated with the single-phase entity. Additionally, such an embodiment includes computing, based on said one or more power consumption parameters and said one or more power supply parameters, at least one of (i) a level of power consumption increase and/or decrease and (ii) a level of power supply increase and/or decrease associated with one or more devices of the given entity to remedy, locally at the single-phase entity, the phase imbalance within the three-phase electrical power system. Such an embodiment of the invention further includes outputting, based on said computing, a schedule of consumption and/or supply from the one or more devices of the single-phase entity for one or more future time steps.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
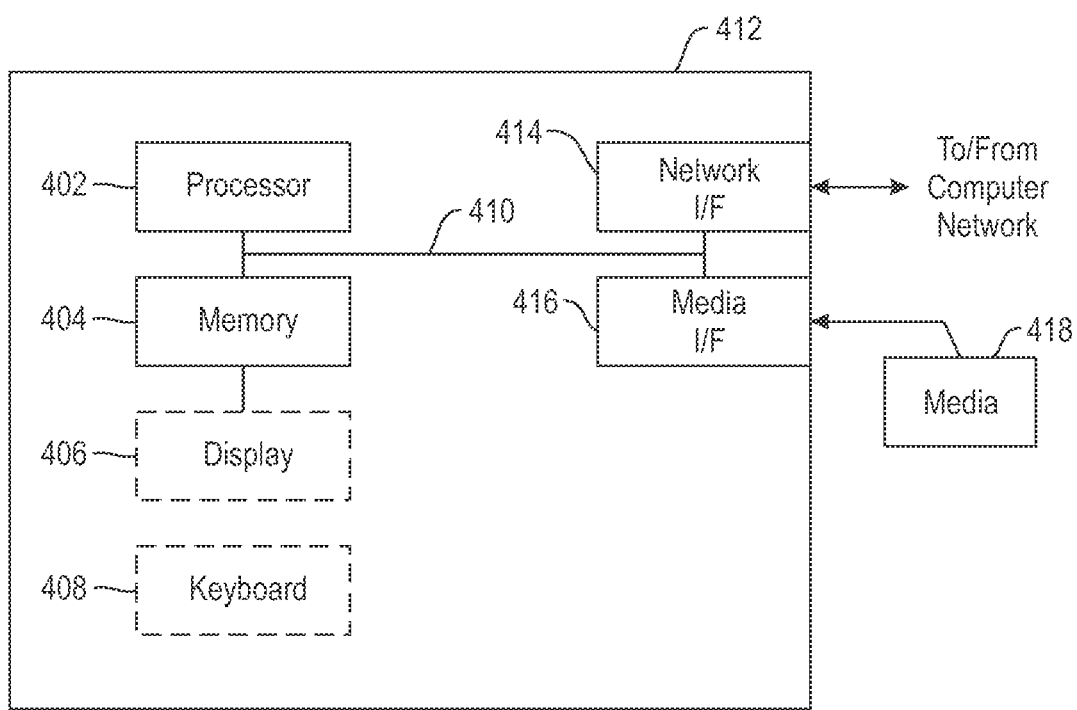
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing techniques wherein individual customer-level or plug-level devices sense imbalance locally by measuring power parameters and working independently to balance the total load on the phases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of use in connection with a multi-phase distribution network having a phase imbalance, the method comprising steps of:
determining, via a given single-phase entity of the multi-phase distribution network having the phase imbalance, one or more power consumption parameters associated with the given single-phase entity of the distribution network;
determining, via the given single-phase entity, one or more power supply parameters associated with the given single-phase entity of the multi-phase distribution network; and
computing, via the given single-phase entity and based on said one or more power consumption parameters and said one or more power supply parameters, at least one of (i) a level of power consumption increase and/or decrease associated with one or more devices of the given single-phase entity and (ii) a level of power supply increase and/or decrease associated with one or more devices of the given single-phase entity to mitigate the phase imbalance across all phases within the multi-phase distribution network;
wherein the steps are carried out by at least one computing device.

2. The method of claim 1, comprising:
outputting, based on said computing, a schedule of power consumption and/or power supply for the one or more devices of the given single-phase entity for one or more future time steps at one or more phases.

3. The method of claim 1, comprising:
obtaining one or more items of sensor data derived from a sensor associated with the given single-phase entity.

4. The method of claim 1, comprising:
determining one or more neutral-to-ground power parameters associated with the multi-phase distribution network to identify the phase imbalance within the multi-phase distribution network.

5. The method of claim 4, wherein said one or more neutral-to-ground power parameters comprises voltage and/or current.

6. The method of claim 1, wherein said one or more power consumption parameters comprises voltage.

7. The method of claim 1, wherein said one or more power consumption parameters comprises current.

8. The method of claim 1, wherein said one or more power consumption parameters comprises a parameter related to aggregate per-phase consumption.

9. The method of claim 1, wherein said one or more power consumption parameters comprises a parameter corresponding to each individual device associated with the single-phase given entity.

10. The method of claim 1, wherein said one or more power supply parameters comprises voltage.

11. The method of claim 1, wherein said one or more power supply parameters comprises current.

12. The method of claim 1, wherein said one or more power supply parameters comprises a parameter related to aggregate per-phase supply.

13. The method of claim 1, wherein said one or more power supply parameters comprises a parameter corresponding to a storage component associated with the given single-phase entity.

14. The method of claim 1, wherein said one or more power supply parameters comprises a parameter corresponding to distributed generation associated with the single-phase given entity.

15. A computer program product for use in connection with a distribution network having a phase imbalance, the computer program product comprising a computer readable storage medium having program instructions embodied therewith, the program instructions executable by a computing device to cause the computing device to:
determine, via a given single-phase entity of the multi-phase distribution network having the phase imbalance, one or more power consumption parameters associated with the given single-phase entity of the distribution network;
determine, via the given single-phase entity, one or more power supply parameters associated with the given single-phase entity of the multi-phase distribution network; and
compute, via the given single-phase entity and based on said one or more power consumption parameters and said one or more power supply parameters, at least one of (i) a level of power consumption increase and/or decrease associated with one or more devices of the given single-phase entity and (ii) a level of power supply increase and/or decrease associated with one or more devices of the given single-phase entity to mitigate the phase imbalance across all the phases within the multi-phase distribution network.

16. A system for use in connection with a distribution network having a phase imbalance, the system comprising:
a memory; and
at least one processor coupled to the memory and configured for:
determining, via a given single-phase entity of the multi-phase distribution network having the phase imbalance, one or more power consumption parameters associated with the given single-phase entity of the distribution network;
determining, via the given single-phase entity, one or more power supply parameters associated with the given single-phase entity of the multi-phase distribution network; and
computing, via the given single-phase entity and based on said one or more power consumption parameters and said one or more power supply parameters, at least one of (i) a level of power consumption increase and/or decrease associated with one or more devices of the given single-phase entity and (ii) a level of power supply increase and/or decrease associated with one or more devices of the given single-phase entity to mitigate the phase imbalance across all the phases within the multi-phase distribution network.

17. A method of use in connection with a three-phase electrical power system with a phase imbalance, the method comprising steps of:
determining, locally at a single-phase entity within the three-phase electrical power system, a phase imbalance across the three phases of the three-phase electrical power system, wherein said determining comprises measuring, locally at the single-phase entity, one or more neutral-to-ground power parameters associated with the three-phase electrical power system;

determining, locally at the single-phase entity within the three-phase electrical power system, one or more power consumption parameters associated with the single-phase entity;

determining, locally at the single-phase entity, one or more power supply parameters associated with the single-phase entity;

computing, based on said one or more power consumption parameters and said one or more power supply parameters, at least one of (i) a level of power consumption increase and/or decrease associated with one or more devices of the single-phase entity and (ii) a level of power supply increase and/or decrease associated with one or more devices of the single-phase entity to mitigate the phase imbalance across the three phases within the three-phase electrical power system; and outputting, based on said computing, a schedule of power consumption and/or power supply for the one or more devices of the single-phase entity for one or more future time steps;

wherein the steps are carried out by at least one computing device.

\* \* \* \* \*